United States Patent [19]

Schwartz

[11] 3,978,936
[45] Sept. 7, 1976

[54] BICYCLE DRIVE MEANS

[76] Inventor: Theodore F. Schwartz, 11660 St. Andrews Way, Scottsdale, Ariz. 85254

[22] Filed: July 11, 1974

[21] Appl. No.: 487,624

[52] U.S. Cl. .................................. 180/31; 180/74; 74/207; 74/213
[51] Int. Cl.² ......................................... B62D 61/00
[58] Field of Search ............. 74/190, 207, 208, 209, 74/206, 213; 180/33 C, 33 D, 34, 74, 33 E, 31

[56] References Cited
UNITED STATES PATENTS

| 788,363 | 4/1905 | Margolin | 74/207 |
| 1,203,927 | 11/1916 | Stagni | 180/131 |
| 1,369,015 | 2/1921 | Evans | 180/131 |
| 1,517,338 | 12/1924 | Bessieve | 180/131 |
| 2,214,106 | 9/1940 | Mayr | 74/190 |
| 3,431,994 | 3/1969 | Wood, Jr. | 180/74 |
| 3,800,898 | 4/1974 | Griffin | 180/34 |
| 3,841,428 | 10/1974 | Bialek | 180/131 |

FOREIGN PATENTS OR APPLICATIONS

| 992,450 | 4/1902 | France | 180/33 D |

*Primary Examiner*—Samuel Scott
*Assistant Examiner*—A. Russell Burke

[57] ABSTRACT

A bicycle drive means for bicycles comprising a motor pivotably mounted on the front fork of a bicycle so as to allow a wheel driving rotor on the motor shaft to frictionally drive the front wheel of the bicycle; manually operable toggle means pivoted to the bicycle handle bars; a spring loaded telescopically compressible strut pivotally interconnecting the toggle lever and the motor for actuating the wheel driving rotor into and out of engagement with the tire on the front wheel of the bicycle; the disclosure also relating to a bicycle frame mounted battery box for carrying a battery to energize said motor.

1 Claim, 7 Drawing Figures

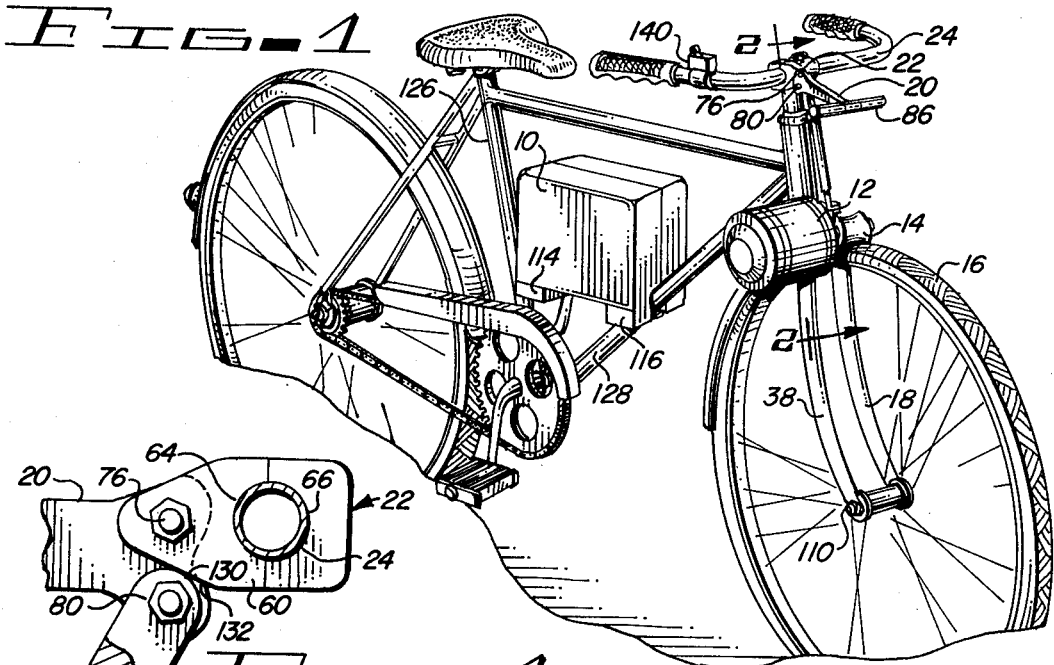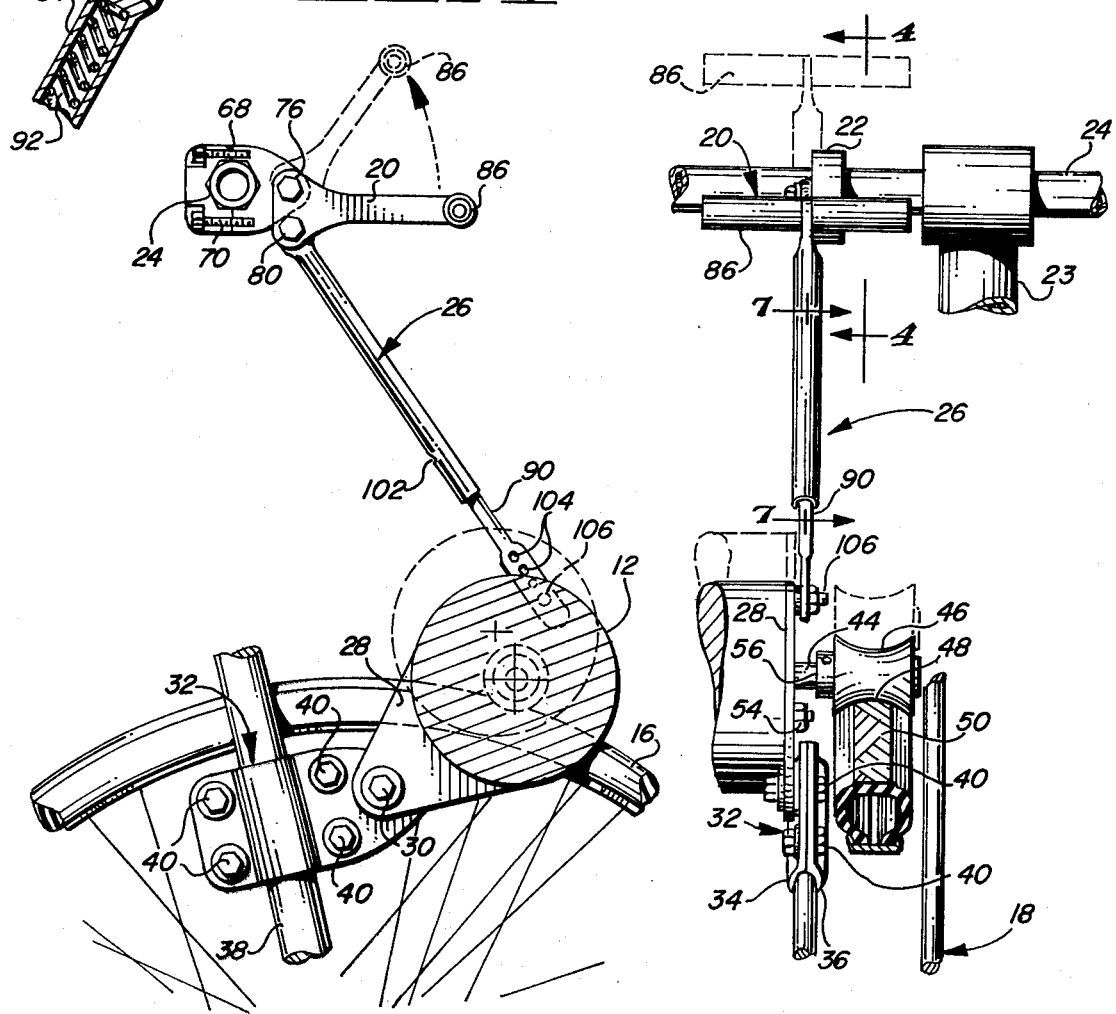

BICYCLE DRIVE MEANS

BACKGROUND OF THE INVENTION

Due to ecological conditions and the need for compatible economical transportation, it has become apparent that gasoline engines and especially the larger engines in various vehicles are a hazard to the ecology and also to the remaining supplies of fossil fuels.

Many persons have now resorted to bicycle transportation; however, in some areas it is necessary to travel substantial distances and in relatively short periods of time, therefore, it has been obvious that some kind of economical motor means for driving a bicycle must be resorted to and such motor means must be preferably electrical so that it does not emit gaseous pollution to the atmosphere.

Additionally, in view of rather complex bicycle drive means such as conventional fossil fuel driven motors and others heretofore used, it has been recognized that a bicycle drive means needs to be readily adaptable and attachable to a conventional bicycle with a minimum of complexity and without altering the bicycle itself. Furthermore, it has been desirable to provide a drive means for bicycles which is very simple to operate so that any person may readily operate it without hazard.

SUMMARY OF THE INVENTION

The present invention relates to a bicycle drive means and more particularly to a bicycle drive means including a D.C. electric motor having a wheel engaging rotor on its shaft and actuatable into and out of frictional engagement with the periphery of the front wheel of the bicycle tire by means of a simple toggle mechanism and wherein a battery box is mounted on the frame of the bicycle to energize the electric motor. The foregoing mechanism being readily and easily connected to a conventional bicycle without altering it. The motor being mounted on a bracket carried by the front fork of the bicycle and the toggle linkage for actuating the motor toward and away from the front wheel being mounted on the handle bars so that the entire drive mechanism is carried by the front fork and handle bars in unison as the bicycle is steered.

The simple toggle mechanism includes an over center toggle mounted on a toggle lever mount which is clamped to the handle bar of the bicycle and the toggle lever is pivotably connected to a telescopically spring loaded strut having a compression spring therein and the lower end of the strut is pivotably connected to the motor so that a movement of the lever in one direction forces the rotor on the motor shaft into engagement with the tire under spring loading and the toggle passes over center in this position to hold the strut compressively to maintain the driving rotor in frictional engagement with the periphery of the bicycle wheel tire.

The spring loaded strut is provided with a hollow tubular body having a plunger reciprocally mounted therein and the plunger is forced by a spring tending to extend the strut longitudinally and a detent means is provided to limit the reciprocal movement of the plunger in the hollow body in both directions allowing the strut to pick the motor up when the toggle lever is moved upward out of over center position and to prevent the plunger from being ejected from the body by the spring under such conditions.

The motor mount for pivotably mounting the motor on a horizontal axis comprises a pair of clamp plates clamped in opposed relation to opposite sides of a fork leg of the bicycle front fork and bolts hold the clamp plates securely fixed on the leg of the front fork, all of which provides for very simple mounting and installation of the entire bicycle drive means on a conventional bicycle.

Accordingly, it is an object of the invention to provide a bicycle drive means which is very simple, economical and easy to install on a conventional bicycle.

Another object of the invention is to provide a bicycle drive means which is particularly compatible with the economy and the ecology.

Another object of the invention is to provide an electric motor drive for bicycles which utilizes a conventional D.C. electric motor and battery carried by the bicycle; the battery being chargeable by 110 volt alternating current such that a conventional battery charger may be utilized when the bicycle is not being ridden to charge the battery.

Another object of the invention is to provide a bicycle drive means for bicycles having very simple controls; namely, a simple toggle lever and a simple electrical switch.

Further objects and advantages of the invention may be apparent from the following specification, appended claims and accompanying drawings.

BRIEF DESCRIPTION OF THE DRAWINGS

FIG. 1 is a perspective view of a bicycle showing a bicycle drive means mounted thereon in accordance with the present invention;

FIG. 2 is an enlarged fragmentary sectional view of the bicycle drive means of the invention taken from the line 2—2 of FIG. 1 showing portions broken away and in section to amplify the illustration and showing by broken lines varying positions of the drive mechanism;

FIG. 3 is a fragmentary front elevational view of the bicycle drive means of the invention showing portions broken away and in section and showing varying positions of the mechanism by broken lines;

FIG. 4 is an enlarged fragmentary sectional view taken from the line 4—4 of FIG. 3;

DESCRIPTION OF THE PREFERRED EMBODIMENTS

Figures 5, 7:
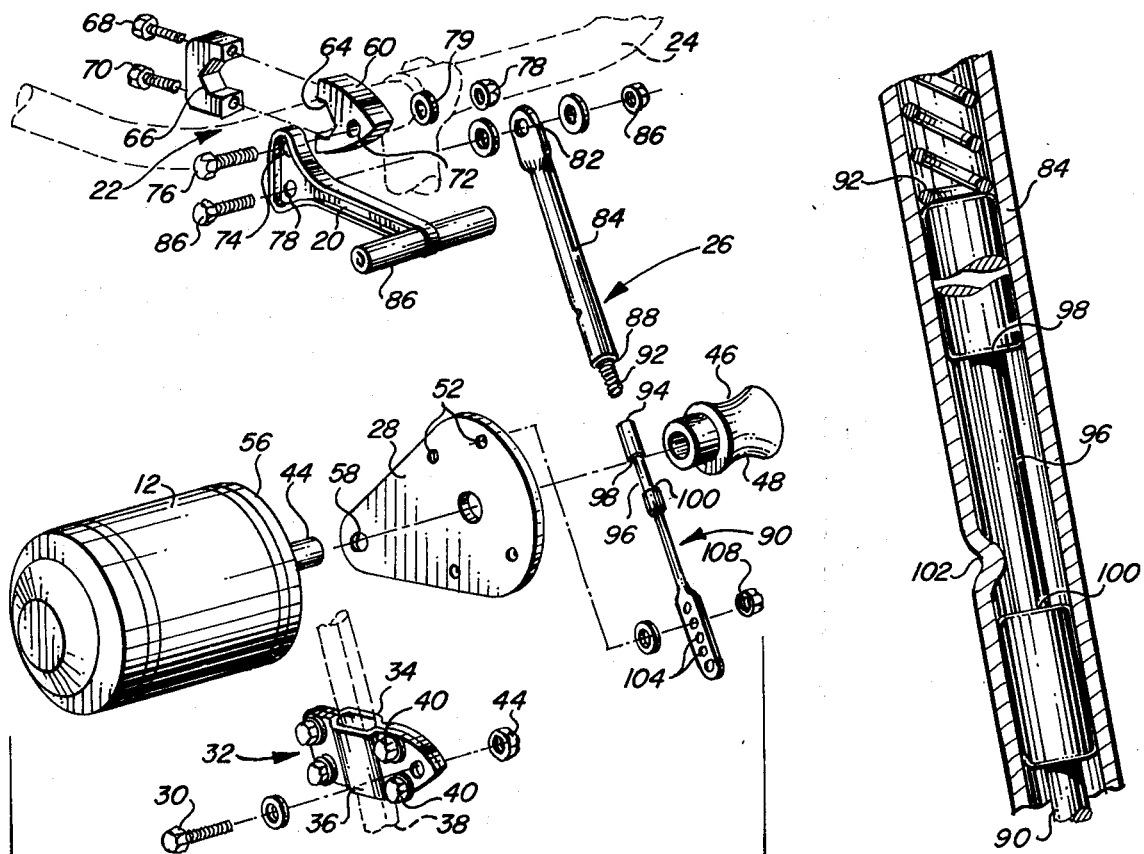
FIG. 5 is an exploded perspective view of the bicycle drive means of the invention.

The bicycle drive means of the invention as shown in FIG. 1 of the drawings comprises: a battery box 10 adapted to carry a D.C. battery enclosed therein together with a suitable battery charging rectifier means adapted for charging the battery with conventional alternating current power supply. The battery carried in the battery box 10 is adapted to energize an electric motor 12 having a wheel engaging rotor 14 on its shaft and adapted to engage the periphery of a bicycle front wheel 16 which is rotatably mounted in the conventional front forks 18 of the bicycle. The forks 18 having a pair of conventional spaced apart legs between which the wheel 16 is rotatably mounted. The motor 12 together with the rotor 14 is adapted to be raised upwardly and moved downwardly by means of a toggle lever 20 pivotably mounted on a mount 22 fixed to the bicycle handle bar 24. A compressible spring loaded strut 26 interconnects the toggle lever 20 and the motor 12 all as will be hereinafter described in detail.

As shown in FIGS. 2, 3 and 4 in assembly and in exploded condition in FIG. 5 of the drawings, the electric motor 12 is provided with a mounting bracket 28 pivotably connected by means of a bolt 30 to a motor mount 32 which comprises a pair of opposed plates 34 and 36 adapted to engage opposite sides of a bicycle front fork leg 38, the clamp plates 34 and 36 being clamped together by bolts 40 which fix the clamp plates of the motor mount securely on the leg 38 of the front fork 18. As shown in FIG. 5 of the drawings, it will be seen that the clamp plates 34 and 36 are provided with an aligned opening 42 extending therethrough which receives the bolt 30 and the bolt 30 is provided with a lock nut 44 screw threaded thereon for holding the motor mount plate 28 in secure pivotal relation with the motor mount 32.

The motor 12 as shown in FIG. 5 of the drawings is provided with a shaft 44 on which a tire engaging rotor 46 is fixed. This tire engaging rotor is provided with a generally concave periphery 48 which is adapted to engage the conventional periphery 50 of the tire 16. It will be seen that the mount plate 28 is provided with openings 52 therein and bolts 54 extend therethrough and secure the plate 28 to the end 56 of the electric motor 12. The mount plate 28 is provided with an opening 58 extending therethrough which receives the bolt 30 as hereinbefore described.

Accordingly, the motor 12 is mounted on the mount 32 to move upwardly and downwardly away from and toward the periphery of the tire 16 so as to engage and disengage the rotor 46 relative to the tire 50.

The toggle lever mount 22 as shown in FIGS. 2, 4 and 5 is provided with a pair of opposed clamp portions 60 and 62 having opposed arcuate concave portions 64 and 66 adapted to engage respective opposite sides of the handle bar 24 which is circular in cross section.

A pair of clamp bolts 68 and 70 extend through the clamp plate 62 and are threaded into the clamp member 60 so as to clamp the opposed arcuate concave portions 64 and 66 into tight frictional engagement with opposite sides of the handle bar 24 for holding the toggle lever mount 22 in fixed position on the handle bar 24.

The clamp portion 60 of the toggle lever mount is provided with an opening 72 extending therethrough and this opening aligns with an opening 74 in the toggle lever 20; a bolt 76 extends through the opening 74 and 72 and a screw threaded nut 78 on the bolt 76 clamps the toggle lever 20 in tight frictional engagement with the clamp portion 60 of the toggle lever mount 22 all as will be hereinafter described in detail.

The toggle lever 20 is provided with another pivot opening 78 therein in which a bolt 80 is positioned and this bolt 80 extends through a comparable opening 82 in a telescopic strut body 84 and screw threaded on the bolt 80 is a nut 86 adapted for holding the upper end of the telescopic strut 84 pivotably connected with the toggle lever 20 at the axis of the bolt 80.

The toggle lever 20 is provided with a manually engageable handle 86 adapted to be grasped by a person riding the bicycle shown in FIG. 1 of the drawings and this handle 86 extends forward and over the front wheel of the bicycle and is adapted to be raised upwardly and backwardly as indicated by broken lines in FIG. 2 of the drawings for raising the motor as will be hereinafter described.

The body 84 of the telescopic spring loaded struut 26 is a hollow tubular body provided with an open end 88 from which a plunger 90 extends. The plunger 90 is compressively engaged by a spring 92 in the body 84, the spring being engaged by an end 94 of the plunger 90 and the plunger 90 is provided with an annulus 96 having opposed abutments 98 and 100 which are engaged by an intended detent 102 in the side wall of the body 84 as shown best in FIG. 7 of the drawings. This detent prevents the spring 92 from forcing the plunger 90 completely out of the open end 88 of the hollow tubular strut body 84.

The normally lower end of the plunger 90 is provided with a plurality of openings 104 adapted to receive a bolt 106 shown best in FIG. 3 of the drawings for pivotably connecting the plunger 90 to the electric motor 12. Positioned on the bolt 106 is a nut 108 which retains the plunger 90 mounted on the bolt 106 in any one of the holes 104 depending upon the adjustment of the strut 26 as desired relative to various bicycles which may vary in dimension between the handle bar 24 and the periphery of the front wheel 16.

It will be noted that the axis 110 of the wheel 16 is generally disposed in a horizontal direction and also the pivotal mount of the motor by the bolt 30 is also on a horizontal axis. Additionally, the bolts 76 and 80 shown in FIG. 5 are on a horizontal axis and the bolt 106 is also on a horizontal axis so that all of the pivotal mechanism is generally axially parallel simplifying the construction and mode of operation of the bicycle drive means of the invention.

Figure 6:
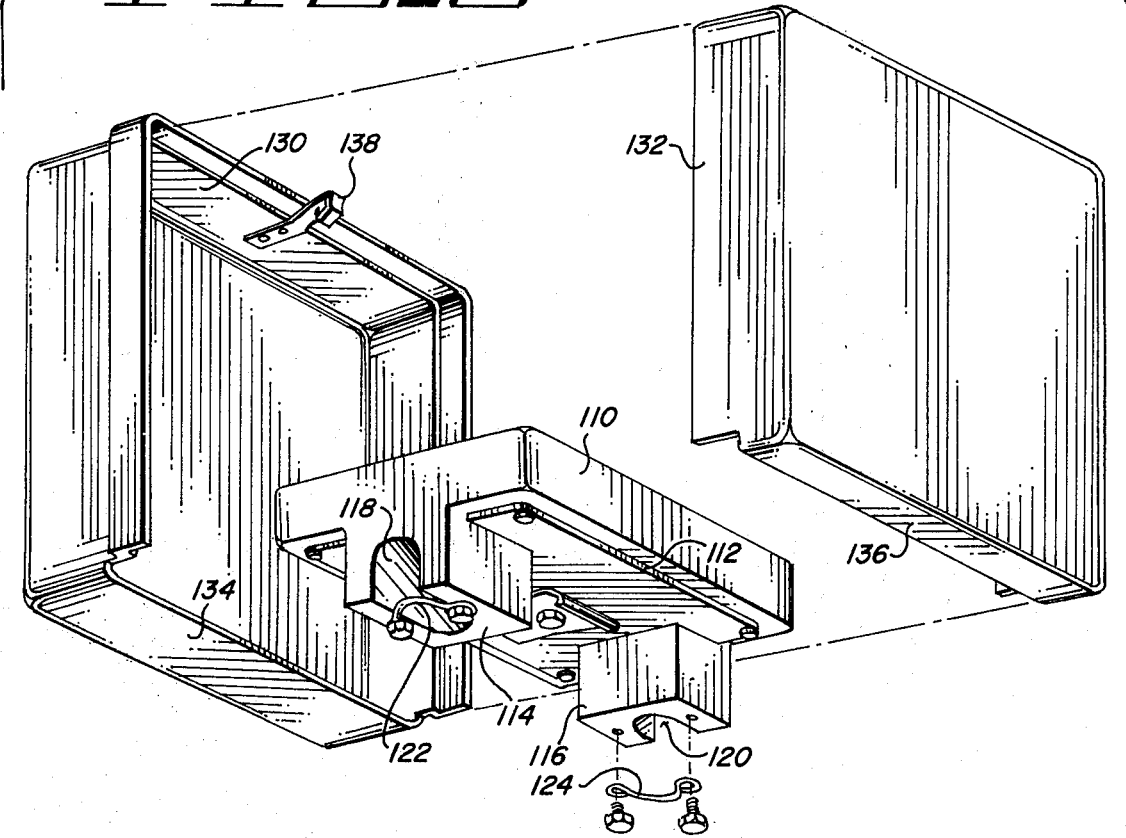
FIG. 6 is an exploded view of the battery box and mounting means of the invention; and, FIG. 7 is an enlarged fragmentary sectional view taken from the line 7—7 of FIG. 3.

The battery box 10 as shown in FIGS. 1 and 6 of the drawings is provided with a mounting frame 110 having a lower side 112 from which project mounting bosses 114 and 116, these bosses having frame member receiving recesses 118 and 120 straddled by frame clamp bars 122 and 124 which fixed to the projections 114 and 116 by suitable bolts for holding the battery box securely in connection with respective tubular elements 126 and 128 of the bicycle frame shown in FIG. 1 of the drawings.

The battery box is provided with a pair of opposed battery cover elements 130 and 132 having lower flange portions 134 and 136 adapted to be clamped around the mount portion 110 by means of a suitable coupling clamp mechanism 138 for enclosing a D.C. battery which is adapted to energize the motor 12 through a conventional switch 140 mounted on the handle bar 24 all as shown best in FIG. 1 of the drawings.

It will be seen that the end of the motor at the plate 28 is offset laterally from the front wheel 16 and offset laterally from the fork supporting neck 23 shown in FIG. 3 of the drawings such that the telescopic strut 26 is substantially aligned with the end of the motor and it is also substantially aligned in the same plane with the clamp plates 34 and 36 which egage the fork leg 38. The toggle lever mount 22 is also generally in the same plane all as shown best in FIG. 3 of the drawings.

In operation, the toggle lever 86 is moved forwardly and downwardly to a position wherein the bolt 80 passes over center of the bolt 76 and an end portion 130 of the strut body 84 engages a lower portion 132 of the toggle lever mount 22 to stop the position of the spring loaded strut against the toggle lever mount thus forming an over center stop for the strut 84 which is under compression holding the rotor 46 against the periphery of the tire 16. The spring 92 tends to extend the strut as hereinbefore described and thus holds the bolt 80 over center of the bolt 76 when the stop portions 130 and 132 are engaged as shown best in FIG. 4 of the drawings.

Thus the rotor 48 is held in tight frictional engagement with the periphery of the tire 16 and the switch 140 may be operated to transfer energy from a battery in the battery box 10 to the motor 12 which rotates its shaft 44 carrying the rotor 46 and thereby motor driving the front wheel 16 of the bicycle.

When it is desired to disengage the rotor 14 from the tire 16 the handle 86 of the toggle lever 20 is raised to a position as indicated by broken lines in FIG. 2 of the drawings which forces the strut 26 upwardly and engages the detent 102 shown in FIG. 7 with the shoulder 98 of the annulus 96 on the plunger 90. This causes the plunger 90 to be retracted upwardly and to pull the motor and the rotor upwardly and to clear the rotor 14 from the tire 16. The toggle lever 20 is held in the broken line position as shown FIG. 2 by frictional bearing of the lever 76 on the toggle lever mount portion 60 which is caused by compressive force of the bolt 76 as it is tightened by means of the nut 78 and spring washer 79 hereinbefore described.

It will be obvious to those skilled in the art that various modifications may be resorted to without departing from the spirit of the invention.

I claim:

1. A bicycle drive means comprising: a motor having a power output shaft extending therefrom; a bicycle tire engaging rotor fixed on said shaft; a bicycle front fork; a front wheel having a horizontal axis and mounted on said fork; a motor mount on said fork; said motor pivotably mounted on said motor mount on a second horizontal axis parallel to that of said wheel; a tire on siad wheel; said tire having a conventional periphery; said wheel engaging rotor being movable into and out of engagement with said tire by respective pivotable movement of said motor on said motor mount about said second horizontal axis; a telescopic spring loaded strut having a lower end pivot portion pivotably mounted on said motor on a third horizontal axis; a toggle lever; said strut having an upper pivotal bearing portion pivotably mounted on said toggle lever on a fourth horizontal axis; a toggle lever mount for said toggle lever; a bicycle handle bar secured to said front fork; said toggle lever mount secured to said bicycle handle bar; a toggle lever bearing pivotably mounting said toggle lever on said toggle lever mount on a fifth horizontal axis; and stop means on said toggle lever mount adapted to limit movement of said toggle lever to retain the axis of said upper pivotal bearing portion in an over center position relative to the axis of said toggle lever bearing for holding said spring loaded strut in telescopically compressed condition and to thereby hold said rotor firmly rotatably engaged with said tire; said telescopic strut is provided with a hollow tubular body having an upper end on which is fixed said upper pivotal bearing portion; said tubular body having a lower open end; a spring in said hollow tubular body; a plunger extending telescopically into said body through said open end thereof; said plunger having a spring engaging end abuted to said spring; said spring tending to force said plunger outwardly from said open end of said body; said plunger having an annulus in its periphery; said body having a detent projecting into said annulus to limit outward movement of said plunger relative to said open end of said body to allow said toggle lever to retract said rotor away from said wheel when said toggle lever is pivotably moved in a direction away from said stop means.

* * * * *